United States Patent
Wang

(10) Patent No.: US 11,038,783 B2
(45) Date of Patent: Jun. 15, 2021

(54) METHOD AND APPARATUS FOR MANAGING NETWORK CONNECTION, AND STORAGE MEDIUM

(71) Applicant: BEIJING BAIDU NETCOM SCIENCE AND TECHNOLOGY CO., LTD., Beijing (CN)

(72) Inventor: Jianhui Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/752,438

(22) Filed: Jan. 24, 2020

(65) Prior Publication Data
US 2020/0252314 A1 Aug. 6, 2020

(30) Foreign Application Priority Data
Feb. 2, 2019 (CN) .......................... 201910107434.4

(51) Int. Cl.
*H04L 12/00* (2006.01)
*H04L 12/26* (2006.01)

(52) U.S. Cl.
CPC ........ *H04L 43/0811* (2013.01); *H04L 43/062* (2013.01); *H04L 43/067* (2013.01); *H04L 43/16* (2013.01)

(58) Field of Classification Search
CPC . H04L 43/062; H04L 43/0811; H04L 43/067; H04L 43/16; H04W 74/00
USPC ......................................................... 709/224
See application file for complete search history.

(56) References Cited

U.S. PATENT DOCUMENTS

| 7,058,031 | B2* | 6/2006 | Bender | .................. H04L 67/16 370/329 |
| 8,185,767 | B2* | 5/2012 | Ballou | .................... H04L 12/10 713/330 |
| 8,266,303 | B2* | 9/2012 | Black | .................. H04L 12/4641 709/228 |
| 9,154,634 | B2* | 10/2015 | Wiley | ..................... H04L 47/10 |
| 9,197,505 | B1* | 11/2015 | Hill | ........................ H04L 67/303 |
| 9,426,029 | B2* | 8/2016 | Saavedra | ................ H04L 43/04 |
| 9,503,970 | B2* | 11/2016 | Horn | ..................... H04W 48/17 |

(Continued)

FOREIGN PATENT DOCUMENTS

| CN | 105049162 A | 11/2015 |
| CN | 105991416 A | 10/2016 |

(Continued)

OTHER PUBLICATIONS

Office Action for Chinese Application No. 201910107434.4, dated May 27, 2020, 16 pages.

*Primary Examiner* — Frantz Coby
(74) *Attorney, Agent, or Firm* — Fay Sharpe LLP

(57) ABSTRACT

According to embodiments of the present disclosure, a method and an apparatus for managing a network connection, and a computer readable storage medium are provided. The method includes determining at least one network connection associated with a target device. The method further includes obtaining a connection state of the at least one network connection, the connection state indicating a data transmission frequency of the at least one network connection. The method further includes determining an operation for the at least one network connection based at least in part on the connection state.

13 Claims, 4 Drawing Sheets

(56) References Cited

U.S. PATENT DOCUMENTS

| | | | |
|---|---|---|---|
| 9,628,326 B2 * | 4/2017 | Nan | H04L 41/0659 |
| 9,647,918 B2 * | 5/2017 | Raleigh | H04W 28/0268 |
| 10,122,798 B2 * | 11/2018 | Fiala | H04W 12/06 |
| 10,637,724 B2 * | 4/2020 | Johnson | H04W 12/062 |
| 10,749,700 B2 * | 8/2020 | Raleigh | H04L 63/0227 |
| 10,750,456 B2 * | 8/2020 | Kwok | H04W 76/16 |
| 2001/0052021 A1 * | 12/2001 | Bolosky | H04L 65/4084 |
| | | | 709/233 |
| 2002/0029273 A1 * | 3/2002 | Haroldson | H04N 21/2408 |
| | | | 709/226 |
| 2003/0046397 A1 * | 3/2003 | Trace | H04L 45/54 |
| | | | 709/227 |
| 2005/0260989 A1 * | 11/2005 | Pourtier | H04W 48/18 |
| | | | 455/435.3 |
| 2006/0126585 A1 * | 6/2006 | Kim | H04W 72/0406 |
| | | | 370/338 |
| 2007/0097877 A1 * | 5/2007 | Hoekstra | H04W 48/18 |
| | | | 370/252 |
| 2008/0155098 A1 * | 6/2008 | Arena | H04W 88/04 |
| | | | 709/225 |
| 2010/0083245 A1 * | 4/2010 | DeHaan | G06F 9/4411 |
| | | | 717/177 |
| 2011/0038381 A1 * | 2/2011 | Oren | H04N 19/61 |
| | | | 370/401 |
| 2013/0242984 A1 * | 9/2013 | Lee | H04L 12/2858 |
| | | | 370/386 |
| 2013/0268655 A1 * | 10/2013 | Luna | H04L 67/322 |
| | | | 709/224 |
| 2014/0247764 A1 * | 9/2014 | Kukosa | H04W 52/0225 |
| | | | 370/311 |
| 2015/0326643 A1 * | 11/2015 | Campbell | H04L 67/42 |
| | | | 709/219 |
| 2018/0198825 A1 * | 7/2018 | Kiefer | H04L 63/02 |
| 2018/0205799 A1 * | 7/2018 | Brooks | H04L 67/16 |
| 2019/0037026 A1 * | 1/2019 | Brooks | H04L 67/14 |
| 2020/0177682 A1 * | 6/2020 | Brooks | H04L 67/42 |

FOREIGN PATENT DOCUMENTS

| | | |
|---|---|---|
| CN | 106533845 A | 3/2017 |
| CN | 108880887 A | 11/2018 |
| WO | 2018085677 A1 | 5/2018 |

* cited by examiner

METHOD AND APPARATUS FOR MANAGING NETWORK CONNECTION, AND STORAGE MEDIUM

CROSS-REFERENCE TO RELATED APPLICATION

The present application is based upon and claims priority to Chinese Patent Application No. 201910107434.4, filed on Feb. 2, 2019, the entirety contents of which are incorporated herein by reference.

FIELD

Embodiments of the present disclosure relate to a computer field, and more particularly to a method and an apparatus for managing a network connection, and a computer readable storage medium.

BACKGROUND

A device, such as a sever, usually has a plurality of network connections with clients and other servers. To process hundreds of or even a greater number of network connections without consuming excessive computing resources, there have been developed a plurality of input/output (I/O) multiplexing ways to process the plurality of network connections with a single thread or a small amount of threads. States of these network connections usually change dynamically. However, in a conventional way, a single way may be used statically to process concurrent network connections.

SUMMARY

According to exemplary embodiments of the present disclosure, a technical solution for managing a network connection is provided.

In embodiments of the present disclosure, there is provided a method for managing a network connection. The method includes determining at least one network connection associated with a target device. The method further includes obtaining a connection state of the at least one network connection, the connection state indicating a data transmission frequency of the at least one network connection. The method further includes determining an operation for the at least one network connection based at least in part on the connection state.

In embodiments of the present disclosure, there is provided an apparatus for managing a network connection. The apparatus includes one or more processors; a memory storing instructions executable by the one or more processors; in which the one or more processors are configured to: determine at least one network connection associated with a target device; obtain a connection state of the at least one network connection, the connection state indicating a data transmission frequency of the at least one network connection; determine an operation for the at least one network connection based at least in part on the connection state.

In embodiments of the present disclosure, there is provided a computer readable storage medium having computer programs stored thereon. When the computer programs are executed by a processor, the method according to embodiments of the present disclosure is implemented. The method may include: determining at least one network connection associated with a target device; obtaining a connection state of the at least one network connection, the connection state indicating a data transmission frequency of the at least one network connection; and determining an operation for the at least one network connection based at least in part on the connection state.

It should be understood that, descriptions in Summary of the present disclosure are not intended to limit an essential or important feature in embodiments of the present disclosure, and are also not construed to limit the scope of the present disclosure. Other features of the present disclosure will be easily understood by following descriptions.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Figure 1:
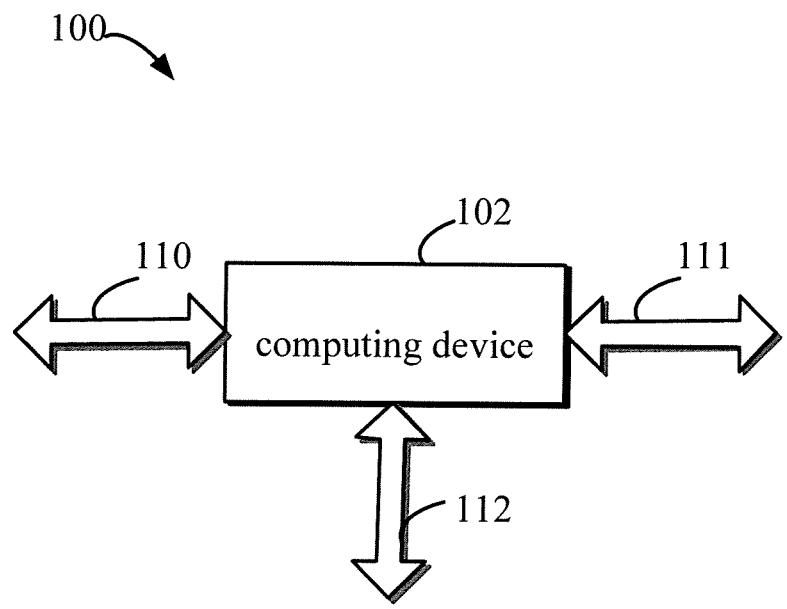
FIG. 1 is a schematic diagram illustrating an exemplary scene where a plurality of embodiments of the present disclosure may be implemented.

Description will be made in detail below to embodiments of the present disclosure with reference to accompanying drawings. Some embodiments of the present disclosure are illustrated in the accompanying drawings. It should be understood that, the present disclosure may be implemented in various ways, but not be construed as a limitation of the embodiments herein. On the contrary, those embodiments provided are merely for a more thorough and complete understanding of the present disclosure. It should be understood that, the accompanying drawings and embodiments of the present disclosure are merely for exemplary purposes, but is not meant to limit the protection scope of the present disclosure.

In the description of embodiments of the present disclosure, the terms "includes" and its equivalents like should be understood as an open "include", that is, "include but not limited to". The terms "based on" should be understood as "based at least in part on". The terms "an embodiment" or "the embodiment" should be understood as "at least one embodiment". The terms "first", "second" and the like may represent different or same objects. Other explicit and implicit definitions may also be included below.

As mentioned above, there have been developed a plurality of input/output (I/O) multiplexing ways. After the I/O multiplexing way is used, an application operated in a computing device such as a sever merely needs to enable one thread and may monitor a plurality of I/O flows at the same time, but does not need to enable a plurality of threads. Resource utilization is improved based on thread multiplexing.

Completing a complete network communication usually includes a time-consuming I/O operation and an intensive computing operation which occupy resources. Taking an I/O operation of a reading and writing request for data of a knowledge map database as an example, a presently employed technology is still a conventional I/O multiplexing technology, including a select way, a poll way, and an epoll way. In the select way, there is a maximum limitation for the number of file descriptors processed simultaneously. When it is detected whether the I/O operations are ready in a polling way, an entire file descriptor set needs to be copied between a buffer area of a kernel and user space. The poll way makes some improvement on the select way. The poll way merely needs to transmit a parameter of one file descriptor set, and also detects whether an I/O event is ready in the polling way. The epoll way makes improvements for the select way and the poll way, and has two operation ways, i.e., a level triggered (LT) and an edge trigger (ET). A default operation mode is the LT. The epoll way is designed for disadvantages of the above two ways. After the introduction of eventpollfs, parameters are transmitted in a shared memory mode, which reduces the number of data replications in the subsequent polling.

When highly concurrent connection requests are processed, there are a plurality of conditions. Not all network connections are in an active state, and some network connections do not have data communication with the server. In the select way and the poll way, a same processing is performed on a socket of each network connection. When a large amount of network connections are processed, overhead of the system will be large, which may affect performance of the server. Although the epoll way makes the improvement for the select way and the poll way, execution efficiency of the epoll way may be lower when most of or even all sockets in a request connection in the server are in the active state. Since a cache area in the epoll way maintains a red-black tree to process the sockets, time complexity for query has no advantage over the select way and the poll way.

In a conventional way, for network connections in a same connection pool, a single way in the above multiplexing ways is merely used to statically process the concurrent network connections, but not a suitable way is selected based on activity of the network connections, which causes consumption of the server resources. In addition, there are a large amount of spare connections between the server and the clients during network communication, which also causes the consumption of the server resources.

According to embodiments of the present disclosure, there is provided a solution for managing a network connection. In the solution, a connection state of the network connection is obtained firstly, the connection state is related to a data transmission frequency or an interval in the network connection; and then an operation for the network connection is determined based on the connection state. The operation includes determining an I/O multiplexing way for a plurality of network connections and disconnecting idle connections. In this solution, a multiplexing way suitable for a current network connection state may be selected dynamically according to the activity of the network connection, and the idle connection which is not active may be disconnected. Therefore, with the solution of the present disclosure, the concurrent network connections may be processed in a way suitable for the current network connection state, thus optimizing resource utilization of the computing device such as the server.

Embodiments of the present disclosure may be described in detail below with reference to the accompanying drawings.

FIG. 1 is a schematic diagram illustrating an exemplary scene 100 where a plurality of embodiments of the present disclosure may be implemented. In the exemplary scene 100, a plurality of network connections 110-112 from other computing devices (not illustrated) are established with the computing device 102. The plurality of network connections may be established in any suitable communication way. The computing device 102 may be a server. Devices establishing the network connections 110-112 with the computing device 102 may be clients or other servers.

It should be understood that, the number of the network connections illustrated in FIG. 1 is merely exemplary, and embodiments of the present disclosure may be applied to a condition with any number of network connections. It further should be understood that, the computing device 102 may be a non-portable computing device, or a portable computing device, such as a mobile phone, a tablet and the like.

Figure 2:
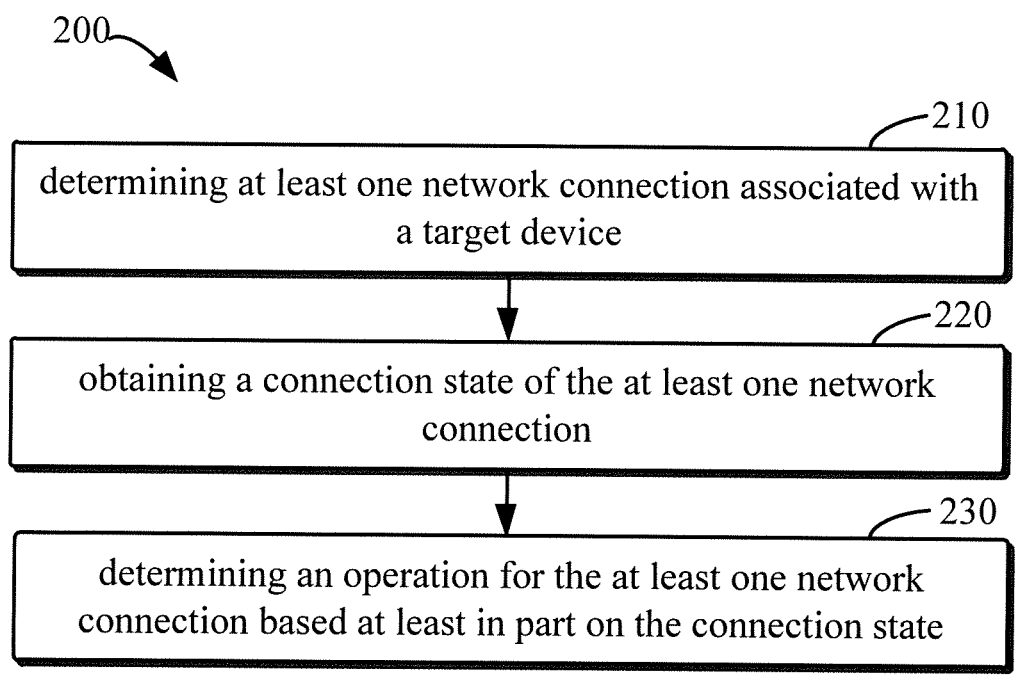
FIG. 2 is a flow chart illustrating a procedure for managing a network connection according to some embodiments of the present disclosure.

For clearly understand the method for managing a network connection according to embodiments of the present disclosure, embodiments of the present disclosure will be further described with reference to FIG. 2. FIG. 2 is a flow chart illustrating a procedure 200 for managing a network connection according to embodiments of the present disclosure. The procedure 200 may be implemented by the computing device 102 illustrated in FIG. 1. For discussing conveniently, the procedure 200 may be described with reference to FIG. 1.

At block 210, the computing device 102 determines at least one network connection associated with a target device. The computing device 102 may determine at least one network connection with other devices from a connection pool for managing a network connection. For example, the at least one network connection includes at least one or all of the network connections 110-112 illustrated in FIG. 1.

In the example of FIG. 1, the target device is the computing device 102. In other examples, the computing device 102 may be separate from the target device. For example, the computing device is disposed on a cloud. Although description is made below with an example of the target device being the computing device 102, embodiments of the present disclosure may also be applied to a condition that the computing device 102 is separate from the target device.

At block 220, the computing device 102 obtains a connection state of the at least one network connection 110. The connection state indicates a data transmission frequency of the at least one network connection 110. The computing device 102 may be associated with the data transmission frequency or a data transmission interval in the network connection to define the connection state. When the target device is separate from the computing device 102, the computing device 102 may receive an indication of the connection state from the target device. In the example of FIG. 1, the computing device 102 may determine the connection state.

In some embodiments, the computing device 102 may determine a time interval associated with the at least one network connection, and determine the connection state of the at least one network connection 110 based on the time interval. The time interval may indicate at least one of: an interval between a current time and a time of a last data transmission occurring in the at least one network connection 110; and an average interval among data transmissions occurring in the at least one network connection 110 within a preset period.

When the time interval is the interval between the current time and the time of the last data transmission occurring in the network connection, the time of the last data transmission occurring in each network connection may be stored, such as a starting time and an ending time. For example, the computing device 102 may determine an interval between the current time and the starting time (or, the ending time) of the last data transmission as the time interval. The computing device 102 may also determine an interval between the current time and a middle time (an average time of the starting time and the ending time) of the last data transmission as the time interval.

When the time interval is the average interval among the data transmissions occurring in the at least one network connection within the preset period, a starting time and/or an ending time of each data transmission occurring in each network connection within a passed preset period (such as, 1 minute) may be stored. The computing device 102 may determine the average interval of the network connections within the preset period based on the starting times, the ending times or the middle times of neighboring data transmissions.

It will be described below how the computing device 102 determines the connection state by taking the network connection 110 as an example. For example, the state of the network connection may include three states: a normal state, a busy state and an idle state. A data transmission in the busy state is more frequent than a data transmission in the normal state. The data transmission in the normal state is more frequent than a data transmission in the idle state. A network connection in the idle state (also called an idle connection below) may be considered as a connection which is not active. The computing device 102 may determine the connection state of the network connection 110 by comparing the time interval associated with the network connection 110 with a threshold interval. The associations between the threshold interval and different connection states may be defined in advance.

When the time interval associated with the network connection 110 is smaller than a first threshold interval, the computing device 102 may determine that the connection state of the network connection 110 is the busy state. When the time interval associated with the network connection 110 is greater than a second threshold interval (the first threshold interval is smaller than the second threshold interval), the computing device 102 may determine that the connection state of the network connection 110 is the idle state. When the time interval associated with the network connection 110 is between the first threshold interval and the second threshold interval, the computing device 102 may determine that the connection state of the network connection 110 is the normal state. In other words, the data transmission frequency of the network connection in the busy state is greater than the first threshold frequency corresponding to the first threshold interval, and the data transmission frequency of the network connection in the normal state is smaller than the first threshold frequency corresponding to the first threshold interval.

A parameter may be configured for each network connection to indicate the state of the network connection. Preset different characters or values may indicate different connection states. For example, "0" may be used to represent the idle state, "1" may be used to represent the normal state, and "2" may be used to represent the busy state.

In some embodiments, the network connection 110 may have a connection state set in advance. Under this case, the computing device 102 may update (or, transform) the connection state of the network connection 110 based on the time interval. The embodiments will be described in detail below with reference to FIG. 3.

Figure 3:
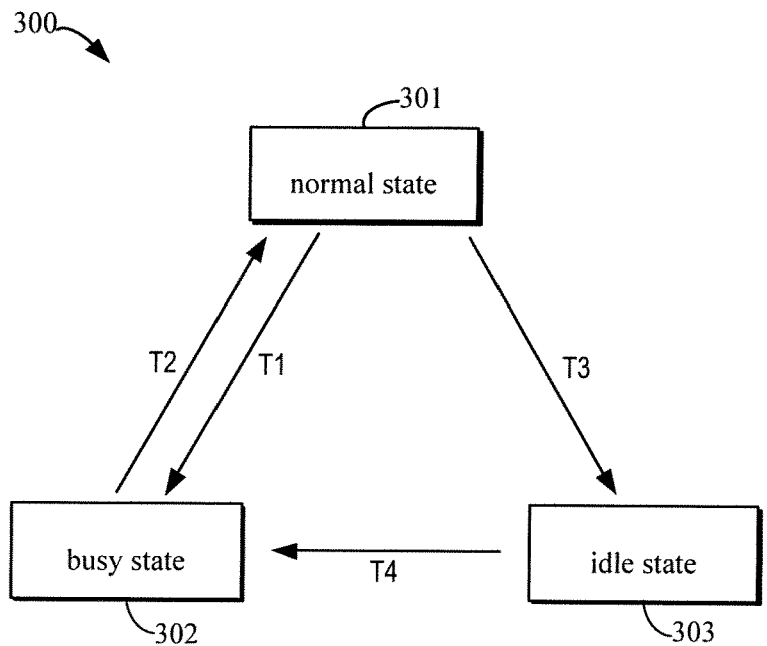
FIG. 3 is a schematic diagram illustrating transforming connection states according to some embodiments of the present disclosure.

FIG. 3 is a schematic diagram 300 illustrating transforming connection states according to some embodiments of the present disclosure. FIG. 3 illustrates three connection states, i.e., a normal state 301, a busy state 302 and an idle state 303. Two threshold intervals including INTERVAL_MIN (which may be the first threshold interval mentioned above) and NTERVAL_MAX (which may be the second threshold interval mentioned above) may be defined in advance to determine whether the connection state of the network connection is transformed.

When the data transmission occurs in the network connection in the normal state 301 within the INTERVAL_MIN, the connection state is transformed from the normal state 301 to the busy state 302. When the data transmission does not occur in the network connection in the normal state 301 exceeding the INTERVAL_MIN, the connection state is transformed into the idle state 303. When the data transmission occurs in the network connection in the idle state 303 within the INTERVAL_MIN, the connection state may be transformed into the busy state 302. When the data transmission does not occur in the network connection in the busy state 302 exceeding the INTERVAL_MIN, the connection state is transformed into the normal state 301.

FIG. 3 illustrates a changing procedure for the connection state of the network connection (such as, the network connection 110). T1, T2, T3 and T4 respectively represent sequential periods. It is determined whether the network connection is transformed based on the INTERVAL_MIN and the INTERVAL_MAX. A relationship of three periods illustrated in FIG. 3 is: T1, T4<INTERVAL_MIN<T2<INTERVAL_MAX<T3.

The network connection may be in the normal state 301 when established firstly. After a period of T1, for example, data coming from the client may be received in the network connection. Since T1 is smaller than the INTERVAL_MIN, a data transmission occurs within the INTERVAL_MIN, and the connection state is transformed into the busy state 302. After a period of T2, a data transmission occurs in the network connection again. Since T2 is greater than the INTERVAL_MIN, an interval between the data transmission and the last data transmission exceeds the INTERVAL_MIN, and the connection state is transformed from the busy state 302 to the normal state 301. And after a period of T3, no new data transmission occurs in the network connection. Since a time interval between the current time and the last data transmission exceeds the INTERVAL_MAX, the connection state is transformed from the normal state 301 to the idle state 303. After a period of T4, a data transmission occurs in the network connection again. Since T4 is smaller than the INTERVAL_MIN, the data transmission occurs within the INTERVAL_MIN, and the connection state is transformed to the busy state 302.

Transformation for the connection state described with reference to FIG. 3 is merely an example. In the example, the two threshold intervals which are the INTERVAL_MIN and the INTERVAL_MAX are set to determine whether the connection state is transformed. In some embodiments, different threshold intervals may be defined for different transformation. For example, four transformations illustrated in FIG. 3 may be separately associated with four different threshold intervals. It should be understood that, the connection state may be divided into more and less states. The detailed value of the threshold interval may be defined in advance according to various factors, such as a computing ability of the computing device 102, an amount of computing resources, and a requirement for a performance of the computing device 102, which is not limited by the scope of the present disclosure.

Referring to FIG. 2, at block 220, for example, the computing device 102 may determine the connection state of the network connection 110 based on the time interval. In some embodiments, when it is determined that the network connection 110 is in the first connection state, the computing device 102 determines whether the time interval (such as, a time interval determined based on the last data transmission) associated with the network connection 110 is greater than the first threshold interval. When the time interval is greater than the first threshold interval, the computing device 102 may update the connection state of the network connection 110 to the second connection state. A first data transmission frequency in the first connection state is greater than a second data transmission frequency in the second connection state. For example, when it is determined that the network connection 110 is in the busy state, the computing device 102 determines whether the time interval of the data transmission is greater than the INTERVAL_MIN. When the time interval is greater than the INTERVAL_MIN, the computing device 102 may update the connection state of the network connection 110 to the normal state.

In some embodiments, when it is determined that the network connection 110 is in the second connection state, the computing device 102 determines whether the time interval (such as, the time interval determined based on the last data transmission) associated with the network connection 110 is smaller than the second threshold interval. When the time interval is smaller than the second threshold interval, the computing device 102 may update the connection state of the network connection 110 to the first connection state. The first data transmission frequency in the first connection state is greater than the second data transmission frequency in the second connection state. For example, when it is determined that the network connection 110 is in the normal state, the computing device 102 determines whether the time interval of the data transmission is smaller than the INTERVAL_MAX. When the time interval is smaller than the INTERVAL_MAX, the computing device 102 updates the connection state of the network connection 11 to the busy state.

At block 230, the computing device 102 determines an operation for the at least one network connection based at least in part on the connection state at block 220. Such operation may include disconnecting the network connections in the busy state, and selecting an I/O multiplexing way for processing these network connections based on a number of network connections which are in the busy state and the normal state.

In some embodiments, the computing device 102 may determine the state of each network connection in a plurality of network connections (such as, all network connections in the connection pool) at block 220, and determine the operation for the plurality of network connections based on the connection state at block 230. For example, one of the poll way and epoll way is selected to perform the multiplexing on the plurality of network connections.

Figure 4:
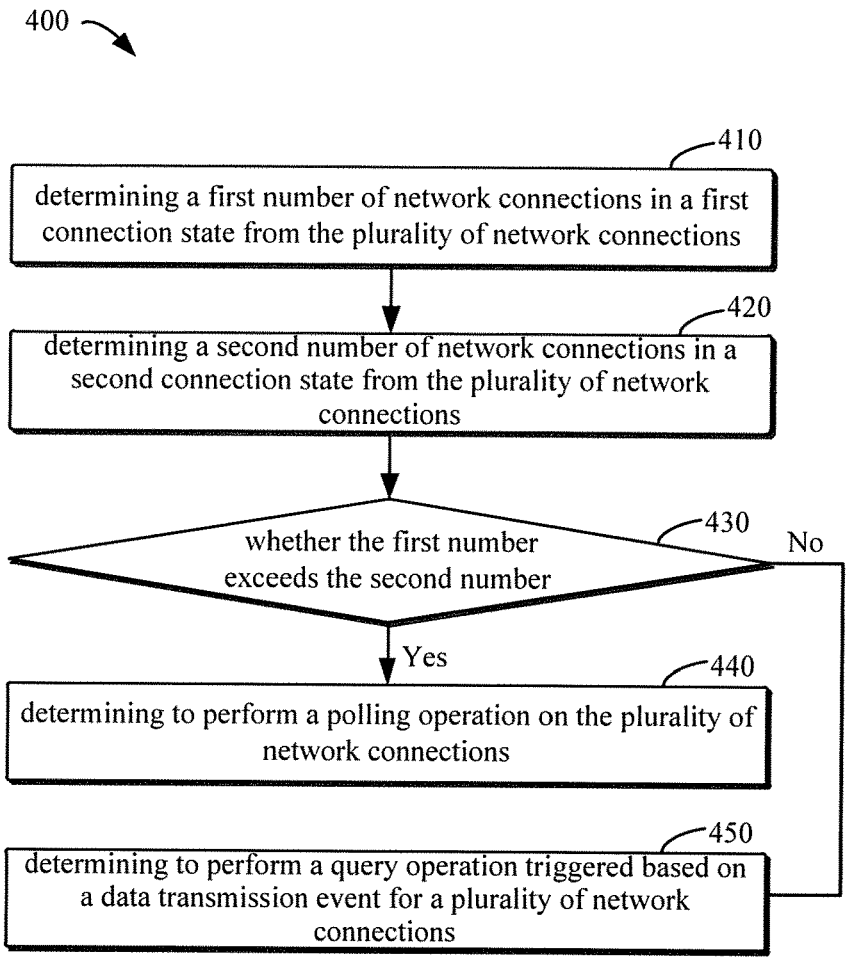
FIG. 4 is a flow chart illustrating a procedure for determining an operation for a network connection according to some embodiments of the present disclosure.

The procedure is described below with reference to FIG. 4. FIG. 4 is a flow chart illustrating a procedure 400 for determining an operation for a network connection according to some embodiments of the present disclosure. The procedure 400 may be described as an implementation at block 230 in FIG. 2.

Referring to FIG. 4, at block 410, the computing device 102 determines a first number of network connections in the first connection state from the plurality of network connections 110-112. The first data transmission frequency of the network connections in the first connection state is greater than a first frequency threshold. For example, the computing device 102 may determine the number of the network connections in the busy state as the first number. In this case, the threshold frequency corresponding to the INTERVAL_MIN is the first threshold frequency.

At block 420, the computing device 102 determines a second number of network connections in a second connection state from the plurality of network connections 110-112. A second data transmission frequency of the network connections in the second connection state is smaller than the first frequency threshold. For example, the computing device 102 may determine the number of the network connections in the normal state as the second number.

At block 430, the computing device 102 determines whether the first number exceeds the second number. When the computing device 102 determines that the first number exceeds the second number, the procedure 400 proceeds to block 440. At block 440, the computing device 102 determines to perform a polling operation on the plurality of network connections. For example, the computing device 102 selects the select way or the poll way to process the plurality of network connections. When the number of the network connections in the busy state is more than the number of the network connections in the normal state, which means that most of network connections in the connection pool are active. In this case, the select way or the poll way is employed to process the plurality of network connections. In such way, each network connection in the connection pool is polled to perform multiplexing.

When the computing device 102 determines that the first number does not exceed (such as, less than) the second number, the procedure 400 proceeds to block 450. At block 450, the computing device 102 determines to perform a query operation triggered based on a data transmission event on a plurality of network connections. For example, the computing device 102 selects the epoll way to process the plurality of network connections. When the number of the network connections in the busy state is less than the number of network connections in the normal state, most of network connections in the connection pool are not active. In this case, the epoll way is more suitable for processing the plurality of network connections. In the epoll way, each network connection in the connection pool will not be polled.

Therefore, in such embodiment, an I/O multiplexing way suitable for a current entire state may be selected based on the states of the plurality of network connections. In detail, the poll way and epoll may be switched with each other flexibly to process a request according to activity of the network connections of the client, thereby maximizing the performance of the server. In an offline architecture such as a knowledge map, a related I/O multiplexing way needs to communicate with a bottom layer of an operating system. In the scene, the method of the present disclosure may be used to improve throughput of the data transmission and improve the utilization of server resources.

Referring to FIG. 2, in some embodiments, when it is determined that the connection state of the network connection 110 is the idle state at block 220, the computing device 102 disconnects the network connection 110. The idle state may indicate that the data transmission frequency of the at least one network connection is smaller than the second frequency threshold. The second frequency threshold may be smaller than or equal to the first frequency threshold mentioned in FIG. 4. The second frequency threshold may correspond to the INTERVAL_MAX. A detailed implementation for disconnecting the network connection will be described below with reference to FIG. 5.

The procedure 200 for managing a network connection according embodiments of the present disclosure is described above. In this way, the operation suitable for the current entire state may be determined according to the connection state of the network connections. For example, a suitable I/O multiplexing way is selected and the idle state is disconnected. Comparing with a conventional single I/O multiplexing way, embodiments of the present disclosure essentially performs encapsulation on I/O multiplexing ways (such as, the poll way and the epoll way) with different characteristics, and makes full use of advantages of different I/O multiplexing ways. Therefore, the method of the present disclosure may enable the concurrent network connections to be processed in a way suitable for the current state, thereby optimizing the resource utilization of the computing device such as the server.

As mentioned above, there are a certain number of idle connections (such as the network connections in the idle state mentioned above) in the network connections establishing communication with the server. These idle connections have no data transmission with the server (such as the computing device 102), but occupy the resources of the server. For saving the resources, communications between these idle connections and the server may be disconnected by employing some ways. When a network connection from the client does no have network communication with the server within a period, it may be determined that the network connection is an idle connection. In this way, a last transmission time at which the server receives data transmitted by each network connection may be saved, and a global timer is defined, to continuously traverse all network connections on the server. However, in this way, when there are a large amount of network connections of the server, consuming time of each traversal may not be ignored.

Another method is to set a timer for each network connection. A time (such as 6 seconds) is set initially. The timer is updated upon receiving data. When the timer is set to zero, the network connection is disconnected. However, when there are a large amount of network connections, the method will affect the performance of the application.

Figure 5:
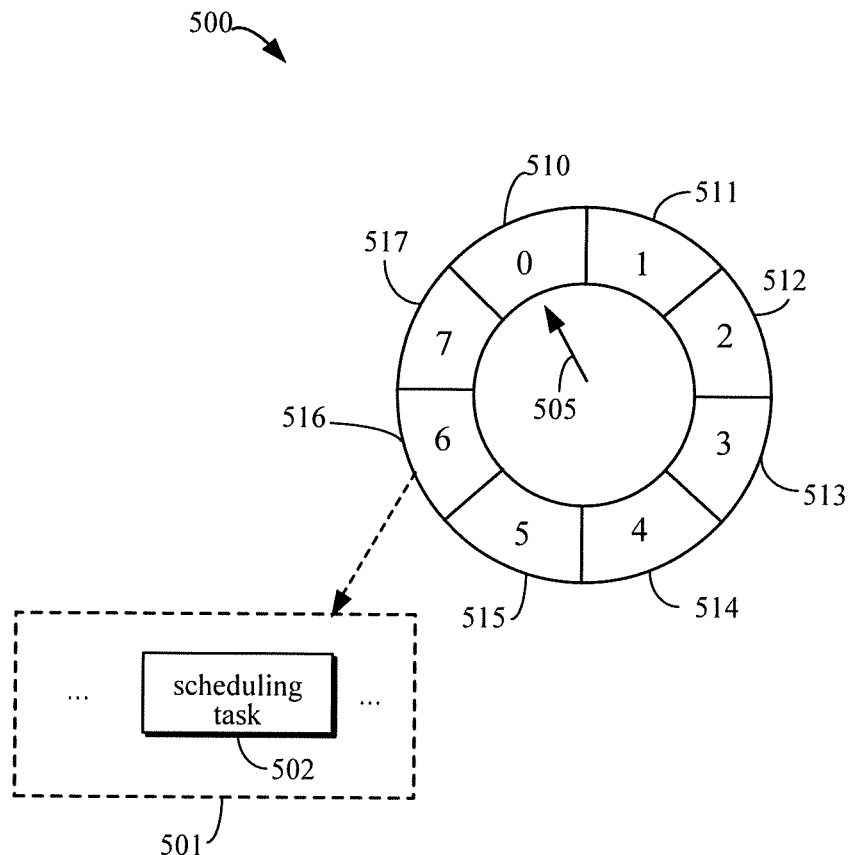
FIG. 5 is a schematic diagram illustrating disconnecting a network connection by utilizing a time wheel according to some embodiments of the present disclosure.

In some embodiments, a time wheel may be used to disconnect the idle connection, thereby reducing the effect of the above two methods on the performance. FIG. 5 is a schematic diagram 500 illustrating disconnecting a network connection by utilizing a time wheel according to some embodiments of the present disclosure.

The time wheel is essentially a circular queue. As illustrated in FIG. 5, the time wheel has eight time slots 510-517. Each time slot (a sub-box) represents a time unit. The smaller the time unit, the higher the accuracy. A pointer 505 of the time wheel points to an element in the circular queue, i.e., a time slot. The time wheel rotates a sub-box every time unit. It is assumed that a second is the time unit, the time wheel illustrated in FIG. 5 may represent a period ranging from 0 seconds to 8 seconds, and the pointer points to 0 currently. When there is a timed task to be executed at this time and the timed time is 5 seconds, then the timed task only needs to be associated with the time slot 515. For example, the timed task is added to a task list corresponding to the time slot 515. When the pointer points to the time slot 515 after 5 seconds, the timed task starts to be executed.

Similar to the processing for disconnecting the idle connection, the computing device 102 may select a target time slot from a plurality of time slots in the time wheel based on a preset timing for disconnecting the idle network connection. It is assumed that the pointer points to 0 at this time, that is, the pointer points to the time slot 510, and the preset timing for disconnecting the idle network connection is 6 seconds (i.e., a scheduling task is executed to disconnect the network connection after 6 seconds), the computing device 102 may select the target slot 516 from the time slots 510-517.

The computing device 102 may associate the scheduling task for disconnecting the at least one network connection with the target time slot 516. For example, the scheduling task 502 may be added to a task list 501 corresponding to the target time slot 516. When the pointer 505 of the time wheel points to the target time slot 516, the computing device 192 may execute the scheduling task to disconnect the network connection.

In addition, when the pointer 505 points to the time slot 512, and there is a new data transmission occurring in the network connection, the scheduling task 502 is associated with a sixth sub-box marked as 0 (i.e., the time slot 510) from the current position. For the plurality of network connections, the scheduling task is put into a corresponding sub-box through a linked list. Each time the pointer moves, a task chain of the current sub-box is traversed to execute the scheduling task for disconnecting the network connection.

In the embodiments, the network connections in the idle state may be disconnected easily by utilizing the time wheel, particularly when there are a large amount of network connections. In this way, the effect of disconnecting the idle network connection on the performance of the server may be reduced.

Figure 6:
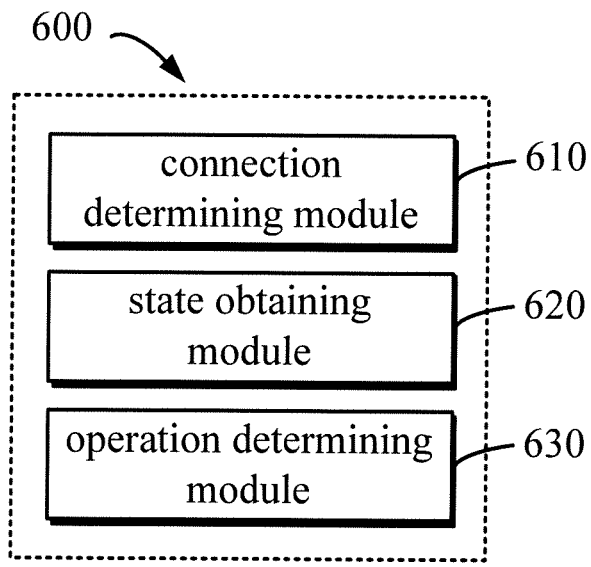
FIG. 6 is a schematic diagram illustrating an apparatus for managing a network connection according to a plurality of embodiments of the present disclosure.

FIG. 6 is a schematic diagram illustrating an apparatus 600 for managing a network connection according to embodiments of the present disclosure. The apparatus 600 may be included in the computing device 102 of FIG. 1 or implemented as the computing device 102. As illustrated in FIG. 6, the apparatus 600 includes a connection determining module 610, configured to determine at least one network connection associated with a target device. The apparatus 600 further includes a state obtaining module 620, configured to obtain a connection state of the at least one network connection. The connection state indicates a data transmission frequency of the at least one network connection. The apparatus 600 further includes an operation determining module 630, configured to determine an operation for the at least one network connection based at least in part on the connection state.

In some embodiments, the at least one network connection includes a plurality of network connections, and the operation determining module 630 includes: a first number determining module, a second number determining module, a first operation determining module, and a second operation determining module. The first number determining module is configured to determine a first number of network connections in a first connection state from the plurality of network connections. A first data transmission frequency of the network connections in the first connection state is greater than a first frequency threshold. The second number determining module is configured to determine a second number of network connections in a second connection state from the plurality of network connections. A second data transmission frequency of the network connections in the second connection state is smaller than the first frequency threshold. The first operation determining module is configured to determine to perform a polling operation on the plurality of network connections in response to that the first number is greater than the second number. The second operation determining module is configured to determine to perform a query operation triggered based on a data transmission event in response to that the first number is smaller than the second number.

In some embodiments, the state obtaining module 620 includes: an interval determining module and a state determining module. The interval determining module is configured to determine a time interval associated with the at least one network connection. The time interval indicates at least one of: an interval between a current time and a time of a last data transmission occurring in the at least one network connection; and an average interval among data transmissions occurring in the at least one network connection within a preset period. The state determining module is configured to determine the connection state of the at least one network connection based on the time interval.

In some embodiments, the state determining module includes: a first interval comparing module and a first state updating module. The first interval comparing module is configured to determine whether the time interval is greater than a first interval threshold in response to determining that the at least one network connection is in a first connection state. The first state updating module is configured to update the connection state of the at least one network connection to a second connection state in response to that the time interval is greater than the first interval threshold. A first data transmission frequency in the first connection state is greater than a second data transmission frequency in the second connection state.

In some embodiments, the state determining module includes: a second interval comparing module and a second state updating module. The second interval comparing module, configured to determine whether the time interval is smaller than a second interval threshold in response to determining that the at least one network connection is in a second connection state. The second state updating module is configured to update the connection state of the at least one network connection to a first connection state in response to that the time interval is smaller than the second interval threshold. A first data transmission frequency in the first connection state is greater than a second data transmission frequency in the second connection state.

In some embodiments, the operation determining module 630 includes: a disconnecting module, configured to disconnect the at least one network connection in response to determining that the connection state is an idle state. The idle state indicates that the data transmission frequency of the at least one network connection is smaller than a second frequency threshold.

In some embodiments, the disconnecting module includes: a selecting module, an associating module, and an executing module. The selecting module is configured to select a target time slot from a plurality of time slots in a time wheel based on a preset timing for disconnecting the at least one network connection. The associating module is configured to associate a scheduling task for disconnecting the at least one network connection with the target time slot. The executing module is configured to execute the scheduling task to disconnect the at least one network connection in response to that a pointer of the time wheel points to the target time slot.

Figure 7:
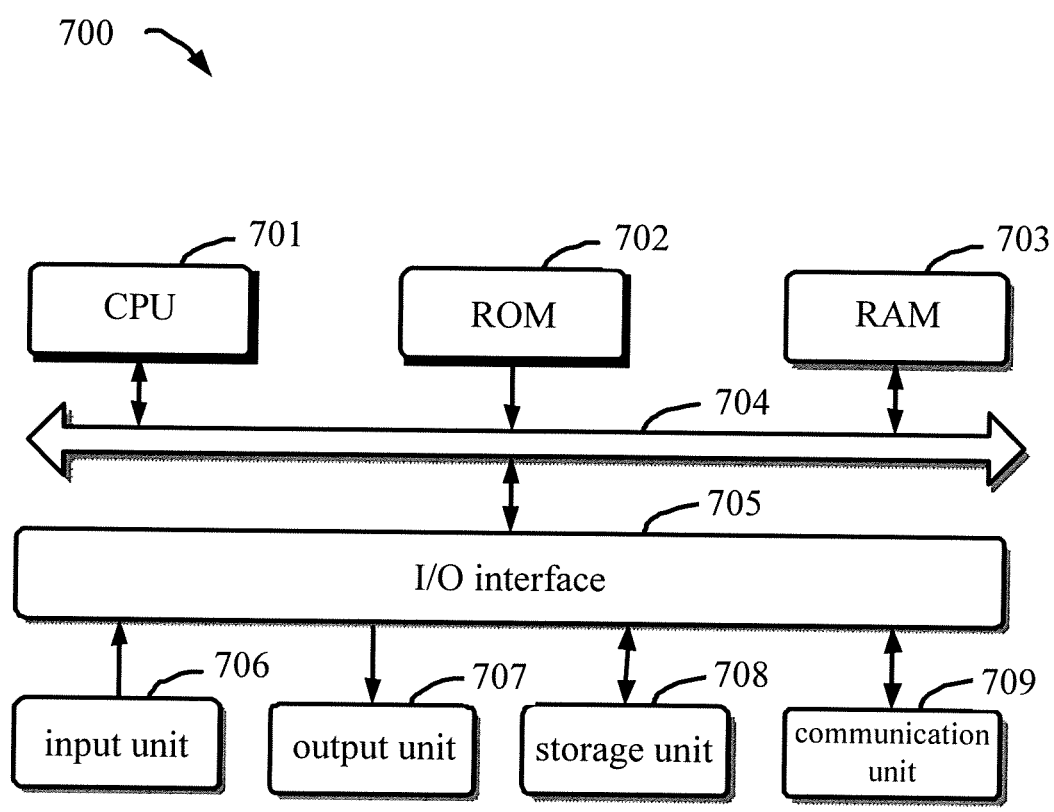
FIG. 7 is a block diagram illustrating a computing device capable of implementing a plurality of embodiments of the present disclosure.

FIG. 7 is a block diagram illustrating a computing device capable of implementing a plurality of embodiments of the present disclosure. The device 700 may be configured as the computing device 102 in FIG. 1. As illustrated in FIG. 7, the device 700 includes a center processing unit (CPU) 701. The CPU 701 may execute various appropriate actions and processes according to computer program instructions stored in a read only memory (ROM) 702 or computer program instructions loaded to a random access memory (RAM) 703 from a storage unit 708. The RAM 703 may also store various programs and date required by the device 700. The CPU 701, the ROM 702, and the RAM 703 may be connected to each other via a bus 704. An input/output (I/O) interface 705 is also connected to the bus 704.

A plurality of components in the device 700 are connected to the I/O interface 705, including: an input unit 706 such as a keyboard, a mouse; an output unit 707 such as various types of displays, loudspeakers; a storage unit 708 such as a magnetic disk, an optical disk; and a communication unit 709, such as a network card, a modem, a wireless communication transceiver. The communication unit 709 allows the device 700 to exchange information/data with other devices over a computer network such as the Internet and/or various telecommunication networks.

The processing unit 701 executes the above-mentioned methods and processes, such as the procedure 200 and/or procedure 400. For example, in some embodiments, the procedure 200 and/or procedure 400 may be implemented as a computer software program. The computer software program is tangibly contained a machine readable medium, such as the storage unit 708. In some embodiments, a part or all of the computer programs may be loaded and/or installed on the device 700 through the ROM 702 and/or the communication unit 709. When the computer programs are loaded to the RAM 703 and are executed by the CPU 701, one or more blocks of the procedure 200 and/or procedure 400 described above may be executed. Alternatively, in other embodiments, the CPU 701 may be configured to execute the procedure 200 and/or procedure 400 in other appropriate ways (such as, by means of hardware).

The functions described herein may be executed at least partially by one or more hardware logic components. For example, without not limitation, exemplary types of hardware logic components that may be used include: a field programmable gate array (FPGA), an application specific integrated circuit (ASIC), an application specific standard product (ASSP), a system on chip (SOC), a complex programmable logic device (CPLD) and the like.

Program codes for implementing the method of the present disclosure may be written in any combination of one or more programming languages. These program codes may be provided to a processor or a controller of a general purpose computer, a special purpose computer or other programmable data processing device, such that the functions/operations specified in the flowcharts and/or the block diagrams are implemented when these program codes are executed by the processor or the controller. These program codes may execute entirely on a machine, partly on a machine, partially on the machine as a stand-alone software package and partially on a remote machine or entirely on a remote machine or entirely on a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

In addition, although respective operations are depicted in a particular order, it should be understood to require that such operations are executed in the particular order illustrated in the drawings or in a sequential order, or that all illustrated operations should be executed to achieve the desired result. Multitasking and parallel processing may be advantageous in certain circumstances. Likewise, although several specific implementation details are included in the above discussion, these should not be construed as limitation of the scope of the present disclosure. Certain features described in the context of separate implementations may also be implemented in combination in a single implementation. On the contrary, various features described in the context of the single implementation may also be implemented in a plurality of implementations, either individually or in any suitable sub-combination.

Although the subject matter has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A method for managing a network connection, comprising:
   determining at least one network connection associated with a target device;
   obtaining a connection state of the at least one network connection, the connection state indicating a data transmission frequency of the at least one network connection; and
   determining an operation for the at least one network connection based at least in part on the connection state, wherein, the at least one network connection comprises a plurality of network connections, and determining the operation for the at least one network connection comprises:
   determining a first number of network connections in a first connection state from the plurality of network connections, a first data transmission frequency of the network connections in the first connection state being greater than a first frequency threshold;
   determining a second number of network connections in a second connection state from the plurality of network connections, a second data transmission frequency of the network connections in the second connection state being smaller than the first frequency threshold;
   determining to perform a polling operation on the plurality of network connections in response to that the first number is greater than the second number; and
   determining to perform a query operation triggered based on a data transmission event in response to that the first number is smaller than the second number.

2. The method of claim 1, wherein, obtaining the connection state of the at least one network connection comprises:
   determining a time interval associated with the at least one network connection, in which, the time interval indicates at least one of:
   an interval between a current time and a time of a last data transmission occurring in the at least one network connection; and an average interval among data transmissions occurring in the at least one network connection within a preset period; and
   determining the connection state of the at least one network connection based on the time interval.

3. The method of claim 2, wherein, determining the connection state of the at least one network connection comprises:
   determining whether the time interval is greater than a first interval threshold in response to determining that the at least one network connection is in a first connection state; and
   updating the connection state of the at least one network connection to a second connection state in response to that the time interval is greater than the first interval threshold, in which, a first data transmission frequency in the first connection state is greater than a second data transmission frequency in the second connection state.

4. The method of claim 2, wherein, determining the connection state of the at least one network connection comprises:
   determining whether the time interval is smaller than a second interval threshold in response to determining that the at least one network connection is in a second connection state; and
   updating the connection state of the at least one network connection to a first connection state in response to that the time interval is smaller than the second interval threshold, in which, a first data transmission frequency in the first connection state is greater than a second data transmission frequency in the second connection state.

5. The method of claim 1, wherein, determining the operation for the at least one network connection comprises:
   disconnecting the at least one network connection in response to determining that the connection state is an idle state, the idle state indicating that the data transmission frequency of the at least one network connection is smaller than a second frequency threshold.

6. The method of claim 5, wherein, disconnecting the at least one network connection comprises:
   selecting a target time slot from a plurality of time slots in a time wheel based on a preset timing for disconnecting the at least one network connection;
   associating a scheduling task for disconnecting the at least one network connection with the target time slot; and
   executing the scheduling task to disconnect the at least one network connection in response to that a pointer of the time wheel points to the target time slot.

7. An apparatus for managing a network connection, comprising:
   one or more processors;
   a memory storing instructions executable by the one or more processors;
   wherein the one or more processors are configured to:
   determine at least one network connection associated with a target device;

obtain a connection state of the at least one network connection, the connection state indicating a data transmission frequency of the at least one network connection; and determine an operation for the at least one network connection based at least in part on the connection state, wherein, the at least one network connection comprises a plurality of network connections, and the one or more processors are configured to:

determine a first number of network connections in a first connection state from the plurality of network connections, a first data transmission frequency of the network connections in the first connection state being greater than a first frequency threshold;

determine a second number of network connections in a second connection state from the plurality of network connections, a second data transmission frequency of the network connections in the second connection state being smaller than the first frequency threshold;

determine to perform a polling operation on the plurality of network connections in response to that the first number is greater than the second number; and determine to perform a query operation triggered based on a data transmission event in response to that the first number is smaller than the second number.

8. The apparatus of claim 7, wherein, the one or more processors are configured to:

determine a time interval associated with the at least one network connection, in which, the time interval indicates at least one of:
  an interval between a current time and a time of a last data transmission occurring in the at least one network connection; and
  an average interval among data transmissions occurring in the at least one network connection within a preset period; and
determine the connection state of the at least one network connection based on the time interval.

9. The apparatus of claim 8, wherein, the one or more processors are configured to:

determine whether the time interval is greater than a first interval threshold in response to determining that the at least one network connection is in a first connection state; and update the connection state of the at least one network connection to a second connection state in response to that the time interval is greater than the first interval threshold, in which, a first data transmission frequency in the first connection state is greater than a second data transmission frequency in the second connection state.

10. The apparatus of claim 8, wherein, the one or more processors are configured to:

determine whether the time interval is smaller than a second interval threshold in response to determining that the at least one network connection is in a second connection state; and update the connection state of the at least one network connection to a first connection state in response to that the time interval is smaller than the second interval threshold, in which, a first data transmission frequency in the first connection state is greater than a second data transmission frequency in the second connection state.

11. The apparatus of claim 7, wherein, the one or more processors are configured to:

disconnect the at least ono network connection in response to determining that the connection state is an idle state, the idle state indicating that the data transmission frequency of the at least one network connection is smaller than a second frequency threshold.

12. The apparatus of claim 11, wherein, the one or more processors are configured to:

select a target time slot from a plurality of time slots in a time wheel based on a preset timing for disconnecting the at least one network connection;

associate a scheduling task for disconnecting the at least one network connection with the target time slot; and execute the scheduling task to disconnect the at least one network connection in response to that a pointer of the time wheel points to the target time slot.

13. A computer readable storage medium having a computer program stored thereon, wherein, the program is configured to implement a method for managing a network connection when executed by the processor, in which the method comprises:

determining at least one network connection associated with a target device;

obtaining a connection state of the at least one network connection, the connection state indicating a data transmission frequency of the at least one network connection; and determining an operation for the at least one network connection based at least in part on the connection state, wherein, the at least one network connection comprises a plurality of network connections, and determining the operation for the at least one network connection comprises:

determining a first number of network connections in a first connection state from the plurality of network connections, a first data transmission frequency of the network connections in the first connection state being greater than a first frequency threshold;

determining a second number of network connections in a second connection state from the plurality of network connections, a second data transmission frequency of the network connections in the second connection state being smaller than the first frequency threshold;

determining to perform a polling operation on the plurality of network connections in response to that the first number is greater than the second number; and determining to perform a query operation triggered based on a data transmission event in response to that the first number is smaller than the second number.

\* \* \* \* \*